(12) United States Patent
Dalla Betta et al.

(10) Patent No.: US 7,788,906 B2
(45) Date of Patent: Sep. 7, 2010

(54) METHODS AND SYSTEMS FOR CONTROLLING INTERNAL COMBUSTION ENGINES

(75) Inventors: Ralph A. Dalla Betta, Mountain View, CA (US); Alberto Boleda, Mountain View, CA (US)

(73) Assignee: Eaton Corporation, Cleveland, OH (US)

( * ) Notice: Subject to any disclaimer, the term of this patent is extended or adjusted under 35 U.S.C. 154(b) by 1077 days.

(21) Appl. No.: 11/494,305

(22) Filed: Jul. 26, 2006

(65) Prior Publication Data

US 2007/0028602 A1 Feb. 8, 2007

Related U.S. Application Data

(60) Provisional application No. 60/703,136, filed on Jul. 27, 2005.

(51) Int. Cl.
*F01N 3/00* (2006.01)
(52) U.S. Cl. ............... 60/286; 60/284; 60/274; 60/295; 60/301
(58) Field of Classification Search ............ 60/274, 60/275, 285, 286
See application file for complete search history.

(56) References Cited

U.S. PATENT DOCUMENTS

| | | | |
|---|---|---|---|
| 6,192,676 B1 * | 2/2001 | Zurbig et al. | 60/286 |
| 6,508,057 B1 * | 1/2003 | Bouchez et al. | 60/286 |
| 6,823,662 B1 * | 11/2004 | Yamamoto et al. | 60/286 |
| 2002/0062641 A1 * | 5/2002 | Shiino et al. | 60/286 |
| 2003/0041594 A1 * | 3/2003 | van Nieuwstadt | 60/286 |
| 2003/0101713 A1 * | 6/2003 | Dalla Betta et al. | 60/284 |
| 2004/0050037 A1 * | 3/2004 | Betta et al. | 60/286 |
| 2005/0208664 A1 * | 9/2005 | Keegan et al. | 436/55 |

\* cited by examiner

*Primary Examiner*—Thomas E Denion
*Assistant Examiner*—Jesse Bogue
(74) *Attorney, Agent, or Firm*—Paul V. Keller (57) ABSTRACT

Described here are systems and methods for controlling IC engines. In one aspect, a method for controlling a fuel processor is provided, the method including i) determining a temperature of an exhaust flow to the fuel processor, the fuel processor including a fuel processor catalyst; ii) determining a concentration of O2 in the exhaust flow upstream of the fuel processor catalyst; iii) determining a rate of the exhaust flow; and iv) adjusting a fuel flow rate to the fuel processor based on i), ii), iii) and a heat capacity value associated with the fuel processor. In other aspects, a system comprising logic operable to control a fuel processor is provided.

25 Claims, 7 Drawing Sheets

METHODS AND SYSTEMS FOR CONTROLLING INTERNAL COMBUSTION ENGINES

CROSS-REFERENCE TO RELATED APPLICATION

This application claims benefit of priority to previously filed U.S. provisional patent application Ser. No. 60/703,136, filed Jul. 27, 2005, entitled METHODS AND SYSTEMS FOR CONTROLLING INTERNAL COMBUSTION ENGINES, and is hereby incorporated by reference as if fully set forth herein.

FIELD

This relates generally to internal combustion ("IC") engines, and in one aspect to methods and systems for controlling IC engines to improve performance and emission levels of IC engines, e.g., that produce nitrogen oxides ("$NO_x$") and/or sulfur emissions.

BACKGROUND

Efforts to improve air quality have lead to many government issued emission controls and regulations. Over the past 30 years, the allowable emissions from spark ignited gasoline engines have been substantially reduced. In tension with the efforts to reduce emissions is a general desire for increased fuel efficiency. This is particularly a problem with diesel engines, which while being very efficient often produce very high emissions of both $NO_x$ and particulate matter ("PM"). Indeed, in order to be compliant with gasoline spark ignited engine regulations, the emissions from a modern diesel engine must be reduced by a factor of around 10 to 50, depending on specific engine type.

Lean-burn engines include both spark-ignition ("SI") and compression-ignition ("CI") engines. In comparison to conventional SI engines, lean-burn SI engines offer 20-25% greater fuel economy, while CI engines offer 50-100% greater fuel economy. CI engines are widely used throughout the United States in heavy-duty vehicles and their use in light-duty vehicles is expected to grow. CI engines are also widely used throughout much of the world in passenger vehicles, light and heavy-duty trucks, and electric power generators.

Currently, automotive emission control is based largely on three-way catalyst technology, which reduces the emissions of carbon monoxide ("CO"), unburned hydrocarbons ("UHCs") and $NO_x$. This technology can be highly effective for ordinary gasoline engines operating at stoichiometric, or near stoichiometric air/fuel ratios. However, three-way catalyst technology is generally not suitable to lean burn engines, which generate a very lean overall exhaust mixture containing a large excess of oxygen. This is because the excess oxygen in the exhaust impedes the reduction of $NO_x$, a major limitation of both lean-burn engines and TWC-based emission control technology. For example, in the case of lean-burn diesel engines, the emission control system must remove $NO_x$ and PM from an exhaust stream containing about 6-15% excess oxygen.

Many technologies have therefore been explored to address the problem of $NO_x$ removal from lean-burn engine exhaust. One such technology utilizes $NO_x$ storage-reduction ("NSR" or NSR-type) systems. This technology has been described throughout the scientific literature and is generally well known in the art. For example, description of this technology may be found in S. Matsumoto, CATTECH, Vol. 4, No. 2, pp. 102-109, 2000, and the references cited therein, all of which are hereby incorporated by reference in their entirety.

As described therein, a typical NSR catalyst has an adsorbent-catalyst system, providing the dual functions of reversible $NO_x$ storage or trapping, and $NO_x$ reduction. One component of the NSR catalyst reacts with $NO_x$ in the gas stream to capture it under oxidizing conditions or conditions where the exhaust stream contains excess $O_2$. This component is selected so that when the exhaust stream is made reducing, that is, containing excess reducing species, the $NO_x$ is released. The NSR catalyst also contains a $NO_x$ reduction catalyst that reacts $NO_x$ with a reducing agent under reducing conditions to form non-polluting $N_2$. When the exhaust stream is made reducing, the $NO_x$ is released and this $NO_x$ reacts with the reducing species on the $NO_x$ reduction catalyst to form $N_2$. One example of an adsorbent-catalyst system is the $Pt/Rh/JBa/TiO_2/ZrO_2/\gamma-Al_2O_3$ system, which has been used commercially in vehicles in Japan.

Advantages of the NSR catalyst include its compatibility and effectiveness with fuel-efficient lean-burn IC engines; its commercial acceptance; its unneeded use of ammonia or urea as reducing agents; and its ability to obtain high $NO_x$ conversions when operated at ideal conditions. For example, $NO_x$ conversions of 90 to 100% have been achieved in tests of diesel engines under ideal conditions using diesel fuel as a reducing agent.

However, NSR technology has some serious disadvantages and limitations as well. During regeneration of the NSR catalyst, the environment of the NSR catalyst must be made rich to convert the trapped $NO_x$ to $N_2$ and to regenerate the catalyst. If the reducing environment in the exhaust were to be obtained by modifying the engine operation from lean to rich, then the engine cycle would be operating in a region where it was not designed to operate. For example a diesel engine, which usually operates without a throttle on the air intake, would now require a throttle to drive the air/fuel ratio into the rich regime. In addition, this would have to be done quickly and quite frequently, from about every 2 to 20 minutes depending on a variety of operating conditions.

Fuel may be injected into the exhaust stream and combusted on the NSR catalyst or on an upstream oxidation catalyst in order to both consume the oxygen and to produce the reducing environment. At high exhaust temperatures, this has been shown to give reasonable regeneration cycles and $NO_x$ conversion efficiency. At low load and low exhaust temperatures, however, this procedure does not work well since the catalyst is not sufficiently reactive with diesel fuel. In addition, the high temperatures produced could drive the NSR catalyst to an undesirably high temperature.

Another disadvantage of NSR technology is that NSR adsorbents are typically very sensitive to sulfur. The $NO_x$ adsorbent material can react with sulfur oxides contained in the fuel to form sulfates, as described for example in S. Matsumoto, CATTECH, Vol. 4, No. 2, pp. 102-109, 2000; K. Yamazaki et al., Applied Catalysis B: Environmental, Vol. 30, Nos. 3 and 4, pp. 459-468, 2001 and the references cited therein, all of which are hereby incorporated by reference in their entirety. These sulfates are not readily decomposed and slowly convert the $NO_x$ adsorbent to an inactive sulfate, reducing its trapping efficiency. Even with low sulfur fuel (e.g., in the range of 15 ppm) the NSR catalyst only lasts for about 500 to 1000 vehicle miles before its $NO_x$ trapping efficiency becomes significantly reduced. To produce a NSR catalyst that would last the 150,000 to 400,000 miles required by current and foreseeable emissions regulations, the NSR unit would have to be designed much too large to be conveniently utilized within the industry. While it has been found that the NSR catalyst unit can be desulfated by treatment in a reducing atmosphere at temperatures of 500-650° C., it is very difficult to operate an engine in a manner so as to produce this environment within the NSR trap unit itself.

Use of diesel fuel as a reductant by direct injection into the exhaust is not very effective at exhaust stream temperatures from 150-250° C., which covers a significant portion of the operating cycle of a diesel engine, including idle and low load. While high $NO_x$ conversions may be possible using a diesel reductant at high inlet temperatures (e.g., ranging from 250-300° C. or above), these temperatures are often unobtainable over a sufficiently wide spectrum of operating conditions to make this a useful approach. Other reducing agents, such as hydrogen, carbon monoxide, alcohols and some low molecular weight hydrocarbons (e.g., propylene), are more reactive at low temperatures and may provide better reducing capacities within a wider range of operating conditions. However, use of these materials would require the vehicle have an additional fuel source, posing significant infrastructure and design implications as well as increased costs. These disadvantages and limitations have largely prevented widespread commercial use and acceptance of NSR technology.

SUMMARY

Described here are systems and methods for controlling IC engines. In one aspect, a method for controlling a fuel processor is provided, the method comprising i) determining a temperature of an exhaust flow to the fuel processor, the fuel processor including a fuel processor catalyst; ii) determining a concentration of $O_2$ in the exhaust flow upstream of the fuel processor catalyst; iii) determining a rate of the exhaust flow; and iv) adjusting a fuel flow rate to the fuel processor based on i), ii), iii) and a heat capacity value associated with the fuel processor.

In one example, the method further includes increasing fuel to the fuel processor to raise the temperature of the fuel processor catalyst to a reforming temperature associated with a temperature for producing reductants, and operating the fuel processor rich subsequent to achieving the reforming temperature. Additionally, an engine characteristic or operation may be adjusted to vary the oxygen level of the exhaust during a portion of the fuel processor operation (e.g., when operating rich).

The method may further comprise adjusting the fuel flow rate to the fuel processor to maintain a temperature of the fuel processor catalyst within a predefined temperature range (e.g., between 550-850° C.) during a reforming process. The fuel flow rate may be adjusted to produce a predefined quantity or concentration of $H_2$ and CO (e.g., to regenerate the $NO_x$ trap), while maintaining the temperature within the predefined temperature range. Predefined concentrations of $H_2$ and CO may each be between 0.5% and 16%, for example.

The method may further includes a warm-up process, including adding fuel to the fuel processor subsequent to the temperature of the fuel processor or the temperature of the gas at the fuel processor inlet reaches a temperature associated with a light off temperature associated with the fuel processor catalyst. Fuel to the fuel processor may be ceased if the temperature of the gas stream at the inlet to the fuel processor is below a temperature associated with an extinction temperature of the fuel processor catalyst. Both the light off temperature and the extinction temperature associated with the fuel processor catalyst may be a function of exhaust flow rate and the values of light off temperature and extinction temperature related to exhaust flow through a look up table. The fuel to the fuel processor may be ceased if the temperature is above a predetermined temperature. Further, the fuel processor may be operated under rich conditions until the predetermined temperature is reached, then fuel flow ceased until a minimum temperature is reached, and then restarted under rich conditions.

In another aspect, a system for controlling a fuel processor is provided. In one example, a system comprising logic operable to adjust a fuel flow rate to the fuel processor in response to signals associated with i) a temperature of an exhaust flow to the fuel processor upstream of the fuel processor, ii) a concentration of $O_2$ in the exhaust flow upstream of the fuel processor, iii) a rate of the exhaust flow, and iv) a value associated with a heat capacity of the fuel processor. The system may further include logic operable to carry out the various methods described herein.

Various aspects and examples of the present invention are better understood upon consideration of the detailed description below in conjunction with the accompanying drawings and claims.

DETAILED DESCRIPTION

The following description is presented to enable any person skilled in the art to make and use various aspects and examples of the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

Described here are systems and methods for controlling internal combustion engines, and in one example, for controlling a fuel processor and $NO_x$ Storage-Reduction ("NSR") system associated with a diesel engine combustion system. Initially, exemplary combustion engine systems including a fuel processor and NSR catalyst are described. This description is followed by exemplary methods of operation and control strategies for operating combustion engine systems including a fuel processor and NSR catalyst.

Figure 1:
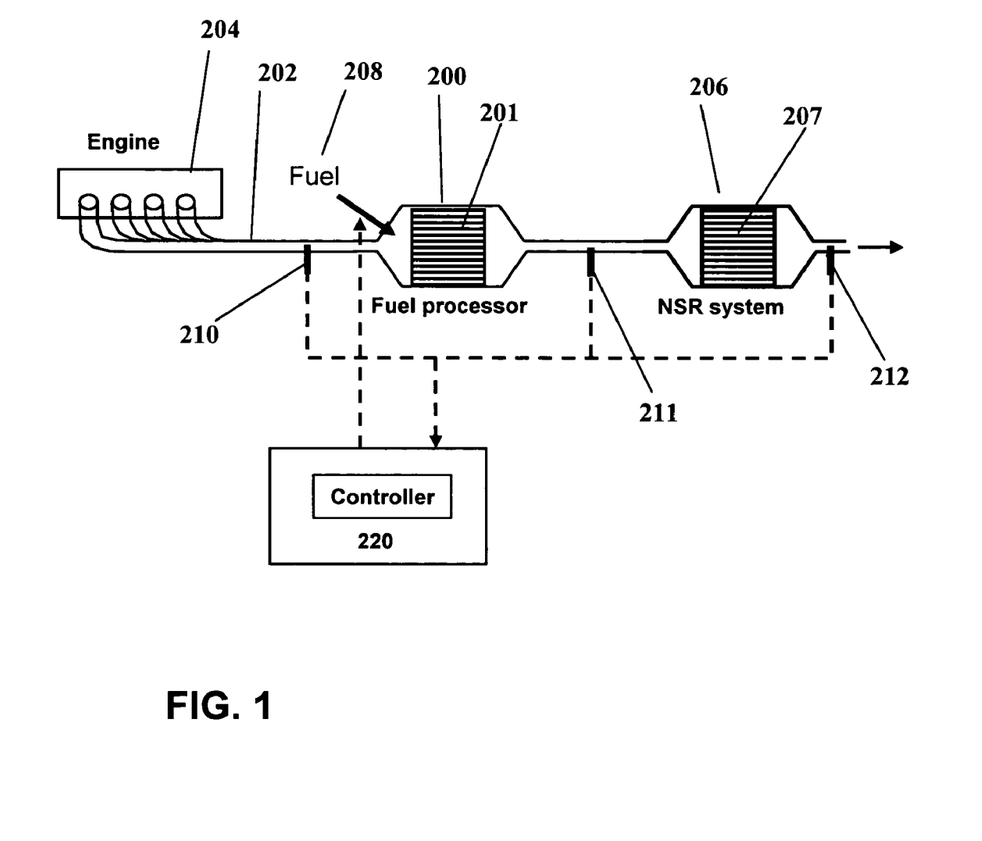
FIG. 1 illustrates an exemplary system including an engine, a fuel processor and an NSR catalyst.

Exemplary Systems:

FIG. 1 illustrates a general schematic of a combustion system including a fuel processor 200 and an NSR catalyst 206. As illustrated therein, fuel processor 200 may be located at a position along exhaust pipe 202 at a distance between engine 204 and NSR catalyst 206. In this way, the exhaust stream from engine 204 will flow first through fuel processor 200 and then through NSR catalyst 206. Fuel processor 200 may be located together with NSR catalyst 206 in a single housing structure, or it may not be. In one variation, as will be described in more detail below, fuel processor 200 is operated intermittently to periodically regenerate the NSR adsorbent of the NSR catalyst 206. When regenerating the NSR adsorbent, fuel 208 may be injected into fuel processor 200, injected at a position upstream of fuel processor 200, or may be injected directly into both fuel processor unit 200 and at a position upstream thereof.

Similar systems including a fuel processor and NSR catalyst are described, for example, in Co-pending U.S. patent application Ser. Nos. 10/431,171 and 10/309,936, both of which are hereby incorporated by reference in their entirety as if fully set forth herein.

Additionally, the exemplary system includes a controller 220 which may receive signals from sensors 210,211, and 212. Sensors 210, 211, and 212, may include various detectors positioned to sense characteristics of the system, e.g., exhaust flow rates, temperatures, $O_2$ concentrations, $NO_x$ concentration, reductant concentrations, and the like. Controller 220 further communicates with a fuel injection valve or the like to control the rate of fuel 208 to fuel processor 200. Controller 220 may include any suitable logic stored therewith or otherwise retrievable for receiving signals from one or more sensors (e.g., sensors 210, 211, and 212) and controlling one or more characteristics of the system (e.g., the rate of fuel 208 to fuel processor 200) to operate the system according to various operating modes (as discussed in greater detail below). Controller 220 may also be part of, incorporated with, or in communication with a controller for operating engine 204.

In one example, fuel processor 200 comprises an inlet for receiving exhaust gas, outlet, and at least one catalyst 201. Additionally, fuel processor 200 may include at least one fuel injection port to inject fuel with exhaust gas, and a mixer located at a position upstream of the fuel processor to aid in mixing the fuel and exhaust gas. In addition, fuel processor 200 may further comprise a fuel preheater, fuel vaporizer, and a secondary injection port for the introduction of air or additional fuel (not shown).

The mixture of exhaust gas and fuel may be sufficiently uniform so that the resulting equivalence ratio is within any desired limit, where the equivalence ratio is the fuel concentration divided by the theoretical fuel concentration needed to fully react all the oxygen present in the gas mixture to form $CO_2$ and $H_2O$. For example, if the fuel processor is to be used to reduce the oxygen concentration in the exhaust to zero before it enters the $NO_x$ trap 207, then the level of mixing will determine the required mixture equivalence ratio. If the mixer produces a mixture at the catalyst inlet of +/−10% uniformity then fuel may be added to give an equivalence ratio of 1.1 so that the lowest equivalence ratio at the catalyst is 1.0. Similarly, for the portion of the fuel processor operating rich to produce $H_2$ and CO, the mixture uniformity will likely be determined by the required equivalence ratio and the required temperature to obtain the necessary reforming performance. In general, mixture uniformity from +/−20% is desirable, while +/−10% is more desirable, and +/ −6% is most desirable.

In one variation, a static (i.e., having no moving parts), in-line mixer that mixes the components into a relatively homogeneous stream is used. In this variation, the mixer acts by changing the flow of the gas stream components, thereby causing mixing of the inlet stream. Various types of static mixers are commercially available and may be used. For example, one type of static mixer has an array of intersecting channels that split the stream into portions, which portions are then rearranged and combined. Other types of mixers include swirlers and counter rotating swirlers, which impart a swirl to the gas mixture. The swirler may have a portion rotating in one direction and another portion rotating in the opposite direction. Pipe sections may also be used as mixers. For example, straight pipe sections with a length/inner diameter ratio ($L/D_i$) greater than 5 or bent pipe sections may be used.

Alternatively, the mixer may have moving parts such as fans, turbines, or acoustic energy input devices, which induce turbulence or mixing within the gas streams. Such mixers may be less desirable, however, since the moving parts may wear and require service and may also require a greater energy input. Evaluation of any improvement in mixing efficiency should be made before determining whether a non-static mixture is sufficiently advantageous to tolerate the additional design complexity and energy consumption.

In addition, it is possible for varnish or carbonaceous deposits to form on the parts of the mixer in contact with fuel spray, especially if the fuel has a high molecular weight and is prone to pyrolysis. Varnish is a hydrocarbon like coating formed by partial pyrolysis of the diesel fuel. Parts of the mixer may be coated with a catalyst capable of oxidizing these varnish or carbonaceous deposits. In this way, the catalyst prevents or removes the deposits, much like a continuous-cleaning or self-cleaning oven.

In one variation, fuel injection ports may be used as mixers. In one variation, the fuel injection ports are located upstream of the fuel processor in the exhaust pipe and a length of the exhaust pipe is used to mix the gas mixture uniformly. The section of pipe length necessary to perform this function is generally thought to be ten times the pipe diameter length. The injection ports may also be located upstream of a bend in the exhaust pipe to further mix the fuel and air. In some instances, it may be desirable to mix the fuel and air quickly or in a short distance prior to their introduction into the catalyst. This is because heavy fuels (e.g., diesel fuels) are prone to pyrolysis or decomposition and produce varnish or other deposits, which may in turn lead to the degradation of the system. In another variation the engine fuel injectors can be used to introduce fuel to the fuel processor with the exhaust system and turbocharger components (not shown) acting as mixers.

The fuel and exhaust mixture then flow into catalyst 201 of fuel processor 200 for reaction. A portion of the fuel reacts with oxygen, while the remaining fuel reacts with water to form carbon monoxide (CO) and hydrogen ($H_2$) by processes well known in the art. The $H_2$ and CO then flow out of the catalyst and out of the fuel processor. The $H_2$ and CO may then flow downstream to NSR catalyst 206. Since the gas mixture comprises a $H_2$ and CO reducing gas mixture, containing little or no oxygen, the NSR catalyst 206 and trap 207 may be rapidly and efficiently regenerated. At the completion of this regeneration cycle, fuel flow to fuel processor 200 is terminated and the NSR catalyst 207 returns to a trapping mode.

Catalyst 201 of fuel processor 200 may comprise a single catalyst unit or may comprise several catalysts in series. For example, a first catalyst may be designed primarily as a combustion catalyst with a catalyst composition selected to react with some of the fuel and oxygen to form carbon dioxide and water and generate heat. Excess fuel and/or fuel injected between catalyst units could then pass to a second catalyst unit where the excess fuel can react with water and carbon dioxide to form CO and $H_2$. This second catalyst can be designed primarily as a reforming catalyst for example. Alternatively, a single catalyst can be designed having an inlet section for oxidation and an outlet section for reforming. In this way, a single catalyst is provided that effectively functions as two separate catalyst units.

The catalyst may comprise one or more metals or oxides as the active catalyst combined with a high surface area refractory support, many of which are well known in the art for oxidation of hydrocarbons. The catalyst may be applied as a washcoat, a porous coating typically comprising a mixture of a high surface area support and active catalyst elements. Alternatively, the coating may comprise a support with a porous structure that has a second oxide portion or a mixture of oxides active for the oxidation of hydrocarbons or carbon. The coating may be applied using any number of processes. For example, it may be applied using plasma flame spraying, chemical vapor deposition, electroplating, electroless plating, application of a sprayable sol (comprising a suspension of the catalyst particles in a liquid), or be applied by dipping the parts into a slurry. One example of a catalyst composition that may be used with the present invention is described in U.S. Pat. No. 5,232,357 by Dalla Betta et. al., which is hereby incorporated by reference in its entirety. The catalysts of the present invention may be composed of any suitable material. For example, they may be composed of pellets or beads in a container, or may be monolithic honeycomb type units. A monolithic honeycomb unit may be desirable because vehicle vibration may cause abrasion and loss of pellet or bead material. Additionally, the monolithic units typically have a lower pressure drop for the flowing exhaust stream. Any monolith may be used. For example, the monolith may be ceramic or may be metal and may have a variety of cell sizes and shapes. Determination of the cell size and shape is dependent on the desired surface area and pressure drop, as well as the relevant heat and mass transfer coefficients. For example, it may be desirable that the fuel processor catalyst have a low heat capacity so it can heat up quickly. Similarly, it may be desirable that the fuel processor catalyst 201 have a low pressure drop so that the overall pressure drop of the entire system does not present a hindrance to operation or reduce the efficiency of the engine.

When a monolithic structure is used for the catalyst substrate, its external or wall surfaces may be coated with a layer of catalyst. This washcoat may comprise a porous inert oxide such as alumina or zirconia and have a highly exposed surface area. This oxide support may contain additional components active for oxidation or reforming depending on the desired function. Preparation and composition of various monolithic catalysts for use with the present invention are described in U.S. Pat. Nos. 5,183,401, 5,259,754, and 5,512,250 to Dalla Betta et. al., all of which are hereby incorporated by reference in their entirety.

The oxidation catalyst may comprise any catalyst capable of oxidizing hydrocarbons. For example, the oxidation catalyst may comprise elements selected from any of Groups VI, VII, VIII and IB of the periodic table of the elements. The more active catalytic elements may be selected from the group Pd, Pt, Ir, Rh, Cu, Co, Fe, Ni, Ir, Cr, and Mo. In some instances, it may be more desirable to use Pd, Pt, Rh, Co, Fe, or Ni, which may be used separately or in combination and may further exist as the element or the oxide in actual use.

One property of the oxidation catalyst that may be desirable is that it has good catalytic activity at very low temperatures. In this way, oxidation can be initiated at low exhaust temperatures without modification of the system design. This property is often referred to as light off temperature, or the temperature at which the fuel and oxygen in the exhaust begins to react. This typically requires that the temperature be below 250° C. and more typically below 150° C.

The oxidation catalyst may be deposited on supports comprising aluminum oxide, silicon oxide, zirconium oxide, or mixtures and combinations thereof, or mixtures or combinations thereof with additional components or elements. Examples are cerium zirconium oxide mixtures or solid solutions, silica alumina, Ca, Ba, Si, or La stabilized alumina, as well as other supports well known in the art. Since diesel fuel with a high molecular weight has a propensity to pyrolyze at high temperatures, the catalyst may also contain catalytic components active for steam cracking of the hydrocarbon fuel. Possible additives may include basic oxides such as calcium oxide, barium oxide, other alkali or alkaline earth oxides and rare earth oxides. The catalyst can be made by impregnating Pd, Pt or any other active catalyst within a porous support such as alumina or zirconia. The metal loading could be in the range of 0.1 to 20% by weight, and more desirably, in the range of 1 to 10% by weight. Several illustrative catalysts that may be used with the present invention include those described in U.S. Pat. No. 5,232,357 to Betta et. al., which is hereby incorporated by reference in its entirety.

The reforming catalyst may similarly use a high surface area support with added active components. For example, the reforming catalyst may comprise components Ni, Rh, Pd, Pt. The catalyst may be selected so that it is capable of remaining stable under normal lean oxidizing conditions and then responding very quickly to the addition of fuel so that $H_2$ and CO are thereby reformed. In this respect, it may be desirable to use Pt, Pd and Rh supported on a porous oxide support.

For example, a typical reforming catalyst may comprise 1% Rh by weight supported on a porous zirconium oxide substrate. This may be accomplished by dissolving rhodium trichloride in water and then impregnating the solution onto a solid zirconium oxide substrate having a high surface area (e.g., ranging from 15 to 150 m.sup.2/g). The rhodium concentration may typically be in the range of 0.1 to 20% by weight of the total washcoat catalyst solid. More typically, the rhodium concentration may be in the range of 1 to 10% of the total washcoat loading. The washcoat may be coated onto the interior channels of a monolithic honeycomb structure at a loading thickness of 1 to 50 mg/cm$^2$ or more typically, in the range of 5 to 15 mg/cm$^2$. Pd or Pt catalysts may be prepared in a similar manner.

The oxidation and reforming catalysts may be combined in the same monolithic unit by combining in the washcoat both the oxidation and reforming components. For example, the active oxidation catalyst Pd and the active reforming catalyst Rh may be combined on a zirconia support to form a catalyst having the oxidizing activity to react the fuel with the oxygen and the reforming activity necessary to reform the remaining fuel to CO and $H_2$. Alternatively, the Rh component may be coated onto the monolithic substrate and calcined or fixed. Separately the Pd may be coated onto a high surface area support and calcined or fixed. These catalysts may also be mixed together to form a Pd/Rh catalyst and this mixed catalyst then coated onto the monolithic substrate.

In one example, a thermal mass (not shown), or heat absorbing component, may be used to help control the system operation, and in particular, to help moderate the temperature between fuel processor 200 and NRS system 206 (particularly NO$_x$ trap 207). This may be useful, because the optimal operating temperature range for fuel processor 200 might be greater than the optimal operating temperature range for the NO$_x$ trap 207, which may perform better at relatively lower temperatures and may be deactivated at relatively high temperatures.

Fuel 208 may include any fuel compatible with the unit. For example, it may be the same type of fuel as used in engine 204. When the fuel is a liquid, such as diesel fuel or gasoline, the exhaust gas mixture may not be hot enough to vaporize the fuel completely. In these circumstances, the mixture temperature may be increased sufficiently to cause some portion of the fuel to react with the oxygen in the exhaust stream passing through catalyst 201, thereby causing the catalyst temperature to increase. As fuel processor catalyst 201 increases in temperature, the remaining liquid fuel may be vaporized within catalyst 201.

In one example, fuel 208 to fuel processor 200 may be preheated so that it is more readily vaporized upon injection, for example. An optional fuel heater may be positioned at any convenient location, either within fuel processor 200 itself, or any desirable position upstream thereof. An exemplary precombustor is described, for example, in U.S. patent application Ser. No. 10/910,213, filed Aug. 2, 2004 and entitled, "PRECOMBUSTORS FOR INTERNAL COMBUSTION ENGINES AND SYSTEMS AND METHODS THEREFOR" the entire content of which is incorporated herein by reference in its entirety.

In some example, a precombustor may be used to provide a substantially uniform fuel air mixture at a fuel combustor inlet, to provide a substantially uniform temperature at a fuel combustor outlet, to combust fuel to heat up the fuel combustor, or to help provide a rich reducing mixture for $NO_x$ trap regeneration. The precombustor may be configured to provide combinations of these functions. Accordingly, in some variations, the precombustor comprises a support material and has at least two adjacently disposed longitudinal channels (not shown) for passage of a gas therethrough. The longitudinal channels have inner surfaces, and in some variations, at least a portion of the inner surfaces of at least one of the channels is coated or impregnated with a catalytic material, and at least a portion is not coated with a catalyst. For example, in some variations, the precombustor is formed of a corrugated foil, which is coated with a catalyst on one side and then rolled into a spiral fashion so as to form a monolithic structure containing channels coated with catalyst and channels not coated with catalyst. The fraction of channels coated with catalyst can vary from about 5% to about 95% and in some variations from about 20% to about 80%. If a herringbone corrugated foil is coated on one side with catalyst and then folded in half and rolled into a spiral configuration, 50% of the channels will be coated with catalyst and 50% will not be coated with catalyst. Such a structure would have the ability to combust very non-uniform fuel concentrations since the catalyst coated surface will be cooled by the surface not coated with catalyst. In addition, such monolithic structures formed by rolling catalyst coated foils would have adjacent layers that are not bonded together and would allow adjacent layers to slip and move both axially and circumferentially with respect to each other. Such movement would make the structure very tolerant of thermal gradients within the monolithic structure since thermal gradients would cause gradients in thermal expansion and localize stress if the structure cannot relieve this stress. Such a loose non-bonded structure could be significantly more tolerant to rapid thermal transients and to thermal gradients caused by non-uniform fuel concentrations.

Illustrative precombustors suitable for use with the exemplary systems and methods described herein are provided in U.S. Pat. Nos. 5,250,489 and 5,512,250, each of which is hereby incorporated by reference herein in their entirety. For example, the precombustor may be a platinum-group, metal-based catalyst on a metal support. The metal support may be assembled, e.g., from or fabricated from metallic materials having a catalytic surface and an adjacent non-catalytic surface. In this way, when rolled into a spiral monolith, some channels will have a catalytic material, while other channels will not.

In yet another alternative, the use of fuel pulsing may be advantageous when the inventive process is used in gas streams with higher levels of oxygen. For example, fuel may be injected into fuel processor 200 in order to preheat the fuel processor catalyst 201 to a desirable temperature (or temperature range). Fuel may further be injected in a pulsed manner so as to generate pulses of $H_2$ and CO, which are then used to regenerate NSR catalyst 206. The pulses may be of any duration, but should be sufficiently short so as to allow the fuel processor catalyst 201 time to cool down between successive pulses. If the fuel pulses are too long, catalyst 201 may overheat, since high levels of oxygen, when fully combusted, result in a large heat release. Various schemes are possible for the number, duration, and timing of the pulses.

NSR catalyst 206 may include any suitable $NO_x$ trap 207. $NO_x$ traps typically comprise an adsorbent-catalyst structure (e.g., a canister), which are placed in the exhaust stream and enable the exhaust stream to flow therethrough. Typical catalysts are honeycomb like, monolithic structures having the adsorbent and catalyst components coated onto their surfaces or walls.

As noted herein, when the adsorbent in the catalyst becomes saturated with $NO_x$, the adsorption becomes less complete and the $NO_x$ level exiting the $NO_x$ trap begins to increase. At this point, the composition of the exhaust stream is changed from an oxidizing to a reducing state, and the reduction cycle begins. A reducing agent is introduced, and the $NO_x$ is desorbed from the adsorbent and is reduced to nitrogen by the catalytic components of the $NO_x$ trap.

Those of ordinary skill in the art will recognize that various other features, systems, devices, injectors, sensors, controllers, and the like may be included with the exemplary combustion system. The exemplary system is not intended to be limiting, but merely illustrative of an exemplary system including a fuel processor, which may be used in conjunction with an $NO_x$ trap.

General Methods of Operation:

In one example, methods for regenerating an $NO_x$ trap broadly comprise the acts of injecting fuel into an exhaust stream upstream of a fuel processor, optionally mixing the exhaust stream with the injected fuel, reacting the fuel and exhaust stream mixture within the fuel processor to generate a reducing gas mixture comprising CO and $H_2$, and introducing the reducing gas mixture into the $NO_x$ trap located downstream of the fuel combustor.

The $H_2$ and CO reducing agent can be formed by a variety of reactions. In one variation, a portion of the fuel is combusted to raise the temperature of the fuel combustor and catalyst therein (e.g., catalyst 201 as shown in FIG. 1) to approximately 500 to 700° C. and the remaining fuel reacts with $H_2O$ and $CO_2$ in the exhaust stream or formed by the fuel combustion to produce the desired $H_2$ and CO. Alternatively, the fuel, $O_2$, $H_2O$, and $CO_2$ can react simultaneously on the catalyst to yield the desired $H_2$ and CO.

A fuel processor, e.g., fuel processor 200 shown in FIG. 1, can be operated in any of several modes. Several modes of operation are shown for example, in FIG. 2. As shown therein, a regeneration cycle 400 consists of a heat up phase A and a reduction phase B. The oxygen concentration 402 from the engine, fuel flow to the fuel processor 404, CO and $H_2$ produced by the fuel processor 406 and temperature of the fuel processor catalyst 408 are indicated. At the start of heat up phase A, fuel is injected to the fuel processor at a rate indicated by 410. This heats the fuel processor catalyst to the desired temperature as shown in curve 408.

Figure 2:
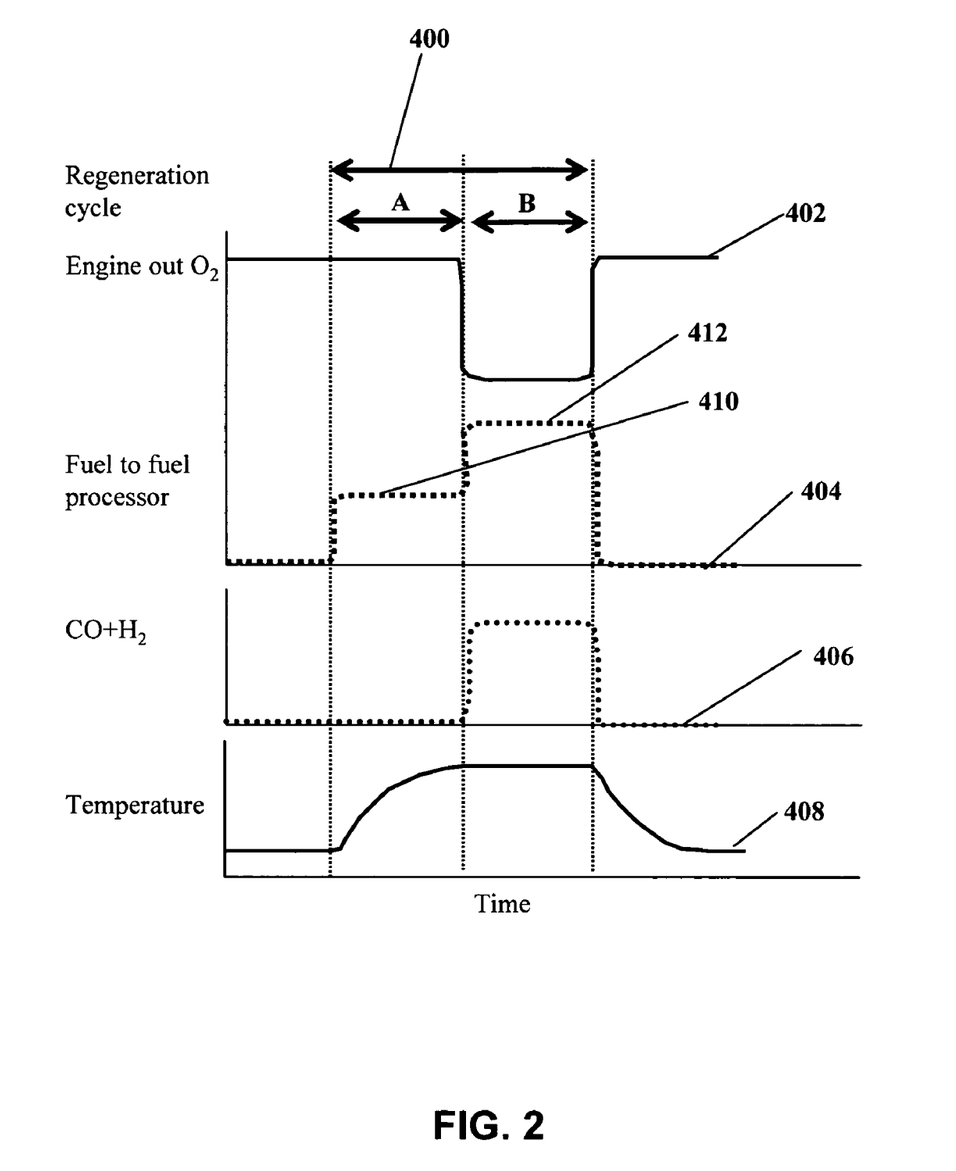
FIG. 2 illustrates an exemplary time-based graph illustrating a method of operating the fuel processor in one example.

When the temperature of the fuel processor catalyst has reached the desired level, the fuel flow is increased to 412 and the oxygen level 402 is decreased by partially throttling the airflow to the engine (in such examples where airflow to the engine may be throttled). If the exhaust oxygen level cannot be reduced sufficiently, then when the fuel flow rate is increased sufficiently so that the overall mixture to the fuel processor becomes rich, the fuel processor catalyst temperature may increase rapidly. In these cases, fuel flow is adjusted, e.g., fuel flow is decreased or shut-off, to control the fuel processor catalyst within a desired operating temperature range.

In either case, the fuel flow and/or oxygen levels are adjusted to cause the overall mixture at the fuel processor catalyst to become rich, that is, having an equivalence ratio of greater than 1. While the mixture is rich, CO and $H_2$ are generally produced as shown in curve 406. When the $NO_x$ trap within the NSR catalyst is fully regenerated, fuel input to the processor is terminated and the engine throttle reopened. One advantage of this cycle is that fuel consumption is minimized. In addition, since the engine is throttled only during the period in which CO and $H_2$ are generated, any negative effects on engine performance and drivability are minimized.

Alternative operating procedures are also possible. For example the fuel flow into the fuel processor can be immediately raised to that level required for reducing agent generation. Then when the fuel processor has achieved an adequate temperature, the engine may be throttled to produce an overall reducing mixture of CO and $H_2$. This can facilitate faster heat up of the fuel processor catalyst since the amount of fuel combustion is higher. However, particular care should be taken in order to avoid overheating the catalyst, thereby deactivating it.

During the regeneration cycle, the outlet gas stream from the fuel processor is essentially free of oxygen. Any oxygen that might bypass the fuel processor catalyst will mix with the reducing gas mixture and react on the NSR catalyst thus reducing the effectiveness of the regeneration process. In addition, the engine operating procedure can take a number of forms. Rather than throttling the engine to reduce the exhaust oxygen concentration, an exhaust gas recirculation system ("EGR") flow can be increased, thus causing the exhaust oxygen level to decrease. Alternatively, the amount of fuel injected into the engine by the engine fuel injectors can be increased. In addition, a combination of these methods or other methods can be used to decrease the exhaust oxygen level.

Figure 3:
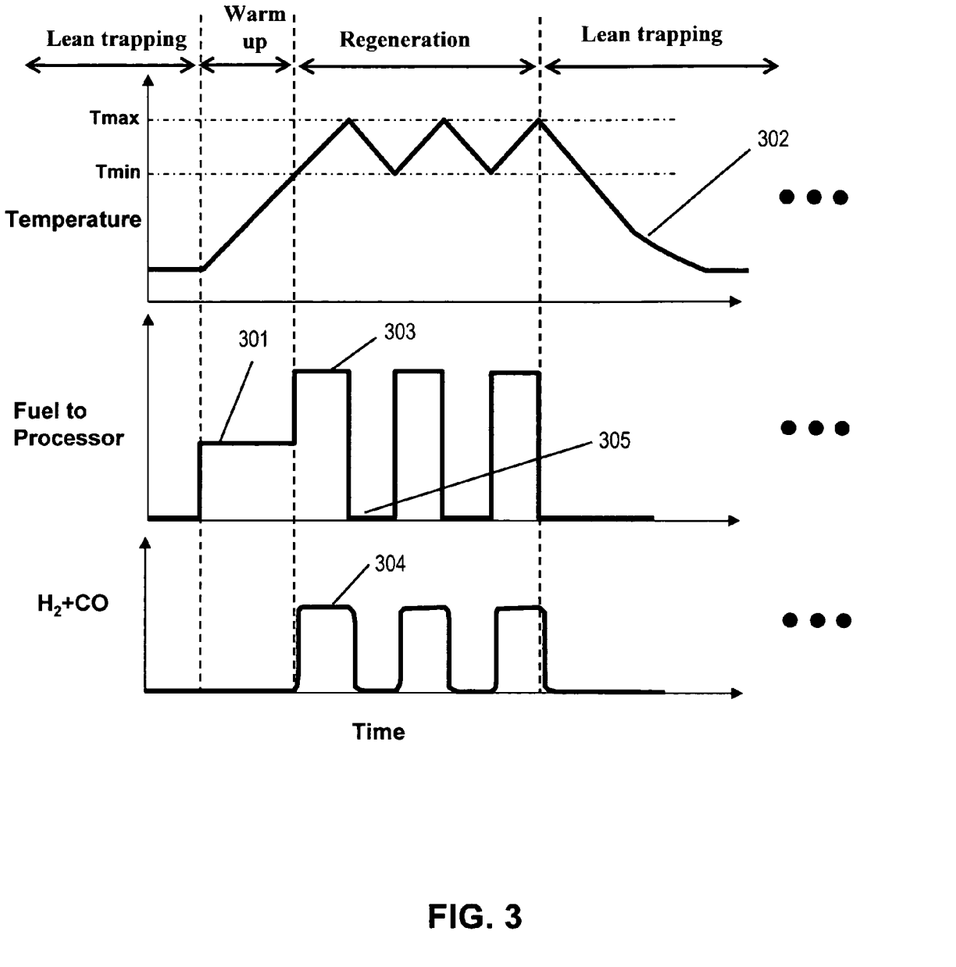
FIG. 3 illustrates an exemplary time-based graph illustrating a method of operating the fuel processor in another example.

FIG. 3 illustrates temperature of the fuel processor catalyst, fuel to the fuel processor, and production of reductants over time during various operating cycles according to one example in which the exhaust oxygen level is high or cannot be controlled to a low value. The modes or operation or cycles of this example include lean-trapping, warm-up, and rich regeneration. Initially, the system is in a lean trapping cycle, wherein the temperature of the fuel processor catalyst is relatively low, no fuel is being supplied to the fuel processor, reductants are not being produced (in any substantial quantity), and the $NO_x$ trap is trapping $NO_x$ emissions.

When the system determines that a regeneration cycle is desired, e.g., based on a $NO_x$ sensor, calculations, tables, timing, or the like, a warm-up cycle may be initiated by injecting fuel 301 to the fuel processor causing the temperature 302 to increase. The warm-up cycle functions to warm the fuel processor, and in particular, the catalyst of the fuel processor to a desired temperature by supplying fuel to the fuel processor. When the fuel processor is at a certain temperature, e.g., at $T_{min}$, the fuel flow rate to the fuel processor is increased to the target rich condition 303 and the production of reductants begins as indicated by 304, thereby regenerating the downstream $NO_x$ trap. Since the exhaust oxygen level is high, heat generation in the furl processor is very high and the fuel processor temperature rises and exceeds the fuel processor temperature limit, $T_{max}$. At this time, the fuel flow to the fuel processor is stopped 305 until the fuel processor temperature drops to $T_{min}$ at which point the fuel flow is again started at a flow rate to achieve the target rich condition and target reductant production. The process of fuel on rich condition and fuel off is repeated until sufficient reductant has been produced to regenerate the NOx trap. This is continued until a desired amount of reductants are produced (e.g., to regenerate the $NO_x$ trap) at which time the fuel flow to the fuel processor is stopped, allowing the temperature of the catalyst to drop as the system returns to a lean trapping cycle. It should be noted that the process shown in FIG. 2 and FIG. 3 are essentially the same. In FIG. 2, the oxygen concentration during the rich regeneration cycle is sufficiently low, in the range of 3 to 6%, that the temperature rise during the rich regeneration is sufficiently small that $T_{max}$ is not exceeded and the rich condition can be maintained until the NOx trap is regenerated. In FIG. 3, the exhaust oxygen level is higher and during rich regeneration operation, the fuel processor temperature rises and when $T_{max}$ is reached, the fuel to the fuel processor must be turned off to all the fuel processor to be cooled by the exhaust flow until $T_{min}$ is reached at which point the rich cycle can be again started and the processes repeated until the NOx trap is sufficiently regenerated.

Methods for facilitating the desulfation of a $NO_x$ trap are also provided. Sulfur in engine fuel produces sulfur oxides (e.g., $SO_2$ or $SO_3$) in the exhaust stream. These sulfur oxides ("$SO_x$") can react with the components of the $NO_x$ trap to form sulfates, which in turn can deactivate it. While typical levels of sulfur in fuel are relatively low, making the deactivation of the trap take anywhere from hours to weeks (corresponding to 100's to 1000's of miles of engine usage), the trap must be able to work far longer than this.

One method of desulfation of the system is accomplished by operating the fuel combustor to produce an outlet gas stream having a temperature in the range of about 500° C. to about 800° C. This stream may then be used to heat a downstream $NO_x$ trap to a temperature in the range of about 500° C. to about 750° C. When the $NO_x$ trap is heated to a desired temperature, the fuel flow to the fuel combustor and/or the engine throttle may be adjusted to produce $H_2$ and CO and to reduce the oxygen concentration exiting the fuel combustor. This reducing gas mixture will then desulfate the $NO_x$ trap by decomposing the sulfates and other species that have caused its deactivation. This hot reducing gas mixture can be maintained until the regeneration is complete. In one variation, the regeneration temperature range for the $NO_x$ trap is from about 300° C. to about 800° C. and more typically, from about 500° C. to about 750° C. In addition, the $H_2$ and CO reducing agent can be fed to the $NO_x$ trap for regeneration as a continuous long reducing pulse or as many short pulses.

In one example, a sulfur trapping material is incorporated in at least a portion of the fuel processor. For example, the sulfur trapping material may be included as a composition of the fuel processor catalyst. This sulfur trapping material traps the $SO_2$ or $SO_3$ in the engine exhaust before it can reach the downstream NSR catalyst and, therefore, prevents deactivation of the NSR catalyst.

However, if a sulfur trapping material in used in combination with the fuel processor, the fuel processor will likely become saturated. If this occurs, the fuel processor should be regenerated to ensure continued useful operation. This regeneration may, for example, be done during the rich cycle when fuel is injected into the fuel processor. When the fuel processor catalyst is heated to a high temperature and the mixture goes rich, any trapped $SO_2$ and, $SO_3$ will be released into the exhaust gas stream and pass out of the fuel processor. Since the released sulfur passes through the NSR catalyst during this rich phase, the poisoning of the NSR catalyst could be significantly reduced.

The sulfur trapping material can be incorporated into the fuel processor catalyst in any number of ways. For example, it can be uniformly distributed within the catalyst layer, or it can be included as a separate layer, either at the side closest to the flowing gas stream or at the side closed to the catalyst support wall. The sulfur trapping material may also be a band located at the outlet end of the fuel processor catalyst where it would be exposed to the $H_2$ and CO generated by the fuel processor. The sulfur trapping material may also be a separate catalyst unit positioned downstream of the fuel processor catalyst. It is often most desirable that the sulfur trapping material is a catalyst band located at the outlet of the fuel processor catalyst, or that the sulfur trapping material is a separate catalyst downstream of the fuel processor catalyst.

A control processor unit or a control system may be used with the systems and methods described herein, and any number of control strategies may be employed. For example, a map of $NO_x$ output versus engine operating conditions, such as load or speed, can be contained in the control system and used to estimate the cumulative $NO_x$ generated by the engine and passed through the $NO_x$ trap. In this way, the $NO_x$ collected by the $NO_x$ trap may be estimated and as the trap reaches capacity, the $NO_x$ regeneration cycle may be initiated. Rather than estimating the $NO_x$ concentration in the exhaust stream, an $NO_x$ sensor could be used to measure the $NO_x$ concentration at the engine outlet and the $NO_x$ collected by the $NO_x$ trap estimated. Alternatively, an $NO_x$ sensor may be placed downstream of the $NO_x$ trap. In this way, once the sensor perceives that the $NO_x$ trap has reached capacity (e.g., by measuring breakthrough $NO_x$ levels), the regeneration cycle may be initiated. The fraction of $NO_x$ adsorbed by the $NO_x$ trap could be estimated by an algorithm based on one or more parameters such as $NO_x$ trap temperature or exhaust gas temperature, exhaust flow rate, $NO_x$ concentration, oxygen concentration in the exhaust and other variables. This estimate of $NO_x$ adsorbed by the $NO_x$ trap can then be used to determine to total $NO_x$ contained by the $NO_x$ trap over the lean trapping time.

Similarly, a control system may be used to monitor and control any or all system temperatures. Illustrative temperatures that may be monitored include inlet and outlet gas mixture temperatures, fuel input temperature, and catalyst temperature. For example, the reformer catalyst temperature may be monitored and controlled via a thermocouple or other temperature-sensing device placed within the catalyst or near the outlet of the catalyst.

In a like manner, the temperature at the outlet of the fuel combustor can be measured and monitored using a thermocouple. The temperature may be controlled by adjusting the fuel flow to the fuel combustor while leaving the oxygen level in the exhaust constant. Alternatively, the temperature may be controlled by keeping the fuel flow to the fuel combustor constant while adjusting the oxygen level, for example, by throttling the engine. Yet another alternative is to adjust both the fuel flow to the fuel combustor and the $O_2$ level. This would allow the system to control both the fuel processor outlet temperature, and the equivalence ratio. In this way, the level of $H_2$ and CO may be effectively controlled.

The fuel processor temperature may be monitored by measuring the gas temperature at the outlet or by measuring the actual temperature of the catalytic material itself. To minimize fuel usage by the fuel processor, a combustibles sensor, or $H_2$ or CO sensor may be placed downstream of the $NO_x$ trap to measure the breakthrough of $H_2$ and CO reducing agent. This in turn signals the control system to stop the regeneration cycle or to adjust the level of reductant being produced by the fuel processor.

If the fuel processor is used to desulfate the $NO_x$ trap, then it may be desirable to measure the temperature at the outlet of the fuel processor to limit the operating temperature to insure durability. In addition, the temperature at the inlet or outlet of the $NO_x$ trap may be measured to ensure that the $NO_x$ unit is at the desired temperature for regeneration. In addition, the temperature of the fuel processor may be modulated to obtain the desired temperature of the $NO_x$ trap for proper desulfation.

A control system may also be used to control the equivalence ratio. For example, when $H_2$ and CO are to be generated by the fuel combustor, the equivalence ratio used with the reformer catalytic material can be controlled by changing the fuel flow or by throttling the airflow to the engine. More specifically, at normal operating engine airflow, fuel may be added to the reformer catalytic material until the temperature is within the range required for reforming the fuel to $H_2$ and CO. At this point, the engine airflow can be throttled to reduce the airflow and $O_2$ concentration in the exhaust. This in turn will increase the equivalence ratio at the catalyst and drive it into the rich region to generate $H_2$ and CO. It is also possible to adjust the fuel flow to the reformer to adjust the equivalence ratio or to adjust both the engine throttle and the fuel flow to obtain the desired reformer equivalence ratio.

The equivalence ratio at the reformer and at the oxidation catalyst can be calculated from a number of engine parameters, including engine RPM and throttle setting, engine inlet air flow rate, turbo boost pressure, torque, engine fuel flow, ambient temperature, ambient pressure and fuel processor fuel flow(s). Alternatively, the exhaust $O_2$ level can be measured using an $O_2$ sensor in the exhaust upstream of the fuel processor and combined with the fuel processor fuel flow and exhaust flow rate to calculate equivalence ratios. Exhaust flow rate can be estimated from inlet air flow rate or from several of the engine parameters listed above.

In one example, an exemplary control method and system control strategy control a fuel processor and $NO_x$ trap system to operate in several different modes of operation (also referred to herein as cycles). One mode of operation includes a lean-trapping cycle, which generally includes the normal mode of operation of the engine in which fuel is not being supplied to the fuel processor and the NSR catalyst is trapping $NO_x$ as the exhaust passes therethrough.

The control method and system further include a lean warm-up cycle, wherein the system heats the fuel processor and fuel processor catalyst to a desired temperature or temperature range for a subsequent regeneration (or desulfation) mode of operation. The regeneration mode of operation may include a rich regeneration mode of operation, in which a rich fuel exhaust gas mixture is converted within the fuel processor to reductants (e.g., $H_2$ and CO) used in the NSR catalyst to reduce trapped $NO_x$ as described here.

The control system may further include a desulfation cycle, in which the NSR catalyst temperature is raised, generally to a temperature greater than during the regeneration mode, and rich conditions are converted within the fuel processor to reductants (e.g., $H_2$ and CO) used in the NSR catalyst to remove trapped $SO_x$. The rich conditions can be continuous or pulsing to produce either a continuous concentration of $H_2$ and CO flowing over the $NO_x$ trap or pulses of $H_2$ and CO flowing over the $NO_x$ trap.

The exemplary control strategies may be used to prevent temperature "overshooting" of the fuel processor catalyst and reduce control the fuel processor during engine or exhaust system fluctuations, e.g., associated with varying conditions of the engine such as exhaust flow rate, temperature, $O_2$ concentration, etc., during various modes of operation. In particular, during warm-up cycles and regeneration (or desulfation) cycles it is generally desired to control and maintain the fuel processor catalyst within a temperature range(s). For example, the fuel processor catalyst may be damaged or deactivated if the temperature is too high; further, if the temperature is too low, the catalyst may be ineffective in producing desired reductants for the NSR catalyst.

The warm-up and regeneration cycles may be repeated intermittently to regenerate the $NO_x$ trap as needed. Additionally, a similar warm-up and regeneration cycle may be carried out for desulfation, however, the temperature ranges may vary as generally it is desired to operate at a greater temperature for desulfation processes.

The temperature range for the fuel processor catalyst may depend on various system and catalyst characteristics. In one example, the desired range (shown as $T_{max}$ and $T_{min}$ in FIG. 3) is between 600 and 800° C. In other examples, the range may be from 550 to 850° C.; of course other temperature ranges are possible and contemplated.

In one example, warm-up cycles and regeneration cycles are operated based generally on model based control strategies. For example, an operating cycle may comprise adjusting the fuel flow to the fuel processor based on 1) an exhaust flow rate to the fuel processor; 2) an exhaust temperature upstream of the fuel processor; 3) an $O_2$ concentration level in the exhaust flow upstream of the fuel processor; and 4) a known (or estimated) heat capacity of the fuel processor. These values may be used by a controller or processor associated with the system to estimate and control the temperature of the fuel processor catalyst.

Determinations of 1), 2), and 3) may be made by appropriate sensors such as thermocouples, flow rate meters, and the like (see, e.g., sensors 210, 211, and 212 in FIG. 1). Alternatively, the parameters 1), 2), and 3) can be calculated from engine operating parameters such as rpm, torque, turbocharger boost pressure, etc. using a multi-parameter table relating these engine operating parameters to parameters 1), 2), and 3). Such a table is sometimes called an "engine map" since it is a map that relates the engine operating conditions to parameters such as exhaust oxygen level, exhaust NOx level, exhaust flow rate, and the like. Further, with regard to 4), the heat capacity value of the fuel processor may be stored in (or at least retrievable and usable by) a system controller or processor. A suitable controller or control processor may sense or receive signals associated with the exhaust flow rate, the exhaust temperature, the concentration of $O_2$ in the exhaust, and the heat capacity of the fuel processor and control the fuel flow to the processor to carry out various operating modes according to predetermined operating schemes as described.

In one example, the temperature of the fuel processor catalyst may be estimated based on two or more conceptual "slices" or portions of the catalyst structure. The temperature of each slice may be estimated based on a suitable model including, e.g., heat transfer coefficients between the exhaust gas and a catalyst monolith structure. Such a method may provide a more accurate estimate of the fuel processor temperature and therefore greater control over the temperature of the fuel processor catalyst during warm-up and/or regeneration cycles. Various other methods may be used to estimate the temperature of the fuel processor and/or fuel processor catalyst during operation.

Figure 4:
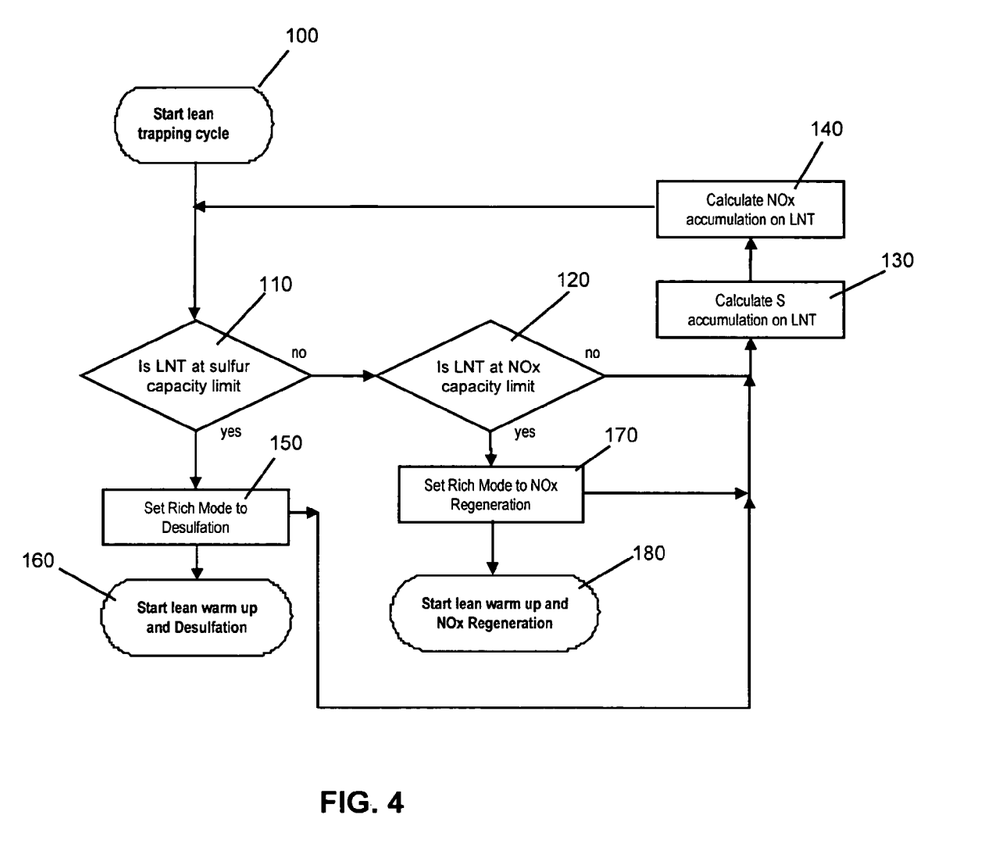
FIG. 4 illustrates an exemplary control strategy for operating a fuel processor across various operating modes according to one example.

One exemplary control strategy and method, which may be implemented with an exemplary controller is illustrated in FIG. 4. At block 100 the lean trapping cycle is operating, e.g., fuel is not being added to the exhaust stream to make the exhaust stream rich, the fuel processor is not operating to produce reductants, and the NSR catalyst is operating to trap $NO_x$, thereby reducing emissions of $NO_x$ from the system. At block 110, the system determines if the sulfur capacity is full and a desulfation mode should be initiated. As discussed here, the system may make this determination in a number of ways, including a sulfur detector, timing, estimate of total fuel used by the engine from a fuel flow meter, estimate of fuel flow to the engine based on rpm and torque or other engine parameters, or various other operating conditions of the engine. In addition, parameters associated with the operation of the NSR catalyst such as $NO_x$ trapping capacity, utilization of reductants during a $NO_x$ regeneration of the $NO_x$ trap or other aspect associated with the sulfur loading of the NSR catalyst could be used to estimate sulfur loading of the $NO_x$ trap. It should be understood that reference to sulfur or $NO_x$ capacity being full are not intended to indicate an actual limit of the capacity of the system, bur rather are used to indicate that any of a number of different criteria have been met to trigger a regeneration cycle.

If the system determines the sulfur loading is at the set sulfur capacity limit, then the system will trigger a desulfation cycle 150 and 160. If the sulfur loading is below a preset capacity value (or other determination is made that a desulfation cycle is not needed), the system determines if the $NO_x$ loading is at the capacity limit at block 120. Again, an $NO_x$ sensor, timing, or other methods may be used to determine if the $NO_x$ loading is at the capacity limit and should trigger a regeneration cycle. When the $NO_x$ loading is not full, the system calculates the additional $NO_x$ accumulation and S accumulation at block 130 and 140 and then returns to the lean trapping cycle at bock 100. When $NO_x$ loading is at the capacity limit, the system sets the Rich Mode to $NO_x$ Regeneration then starts a lean warm up and $NO_x$ regeneration at 180.

Figure 5:
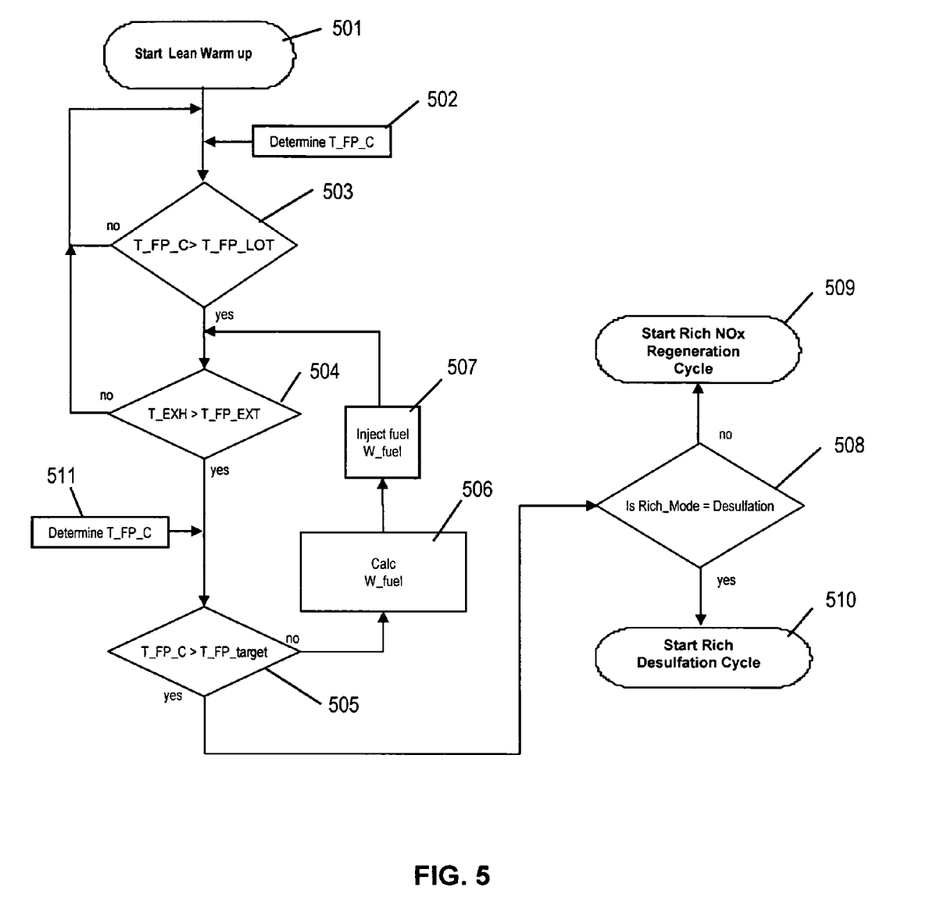
FIG. 5 illustrates an exemplary control strategy for operating a fuel processor during a warm-up mode of operation.
Figure 6A:
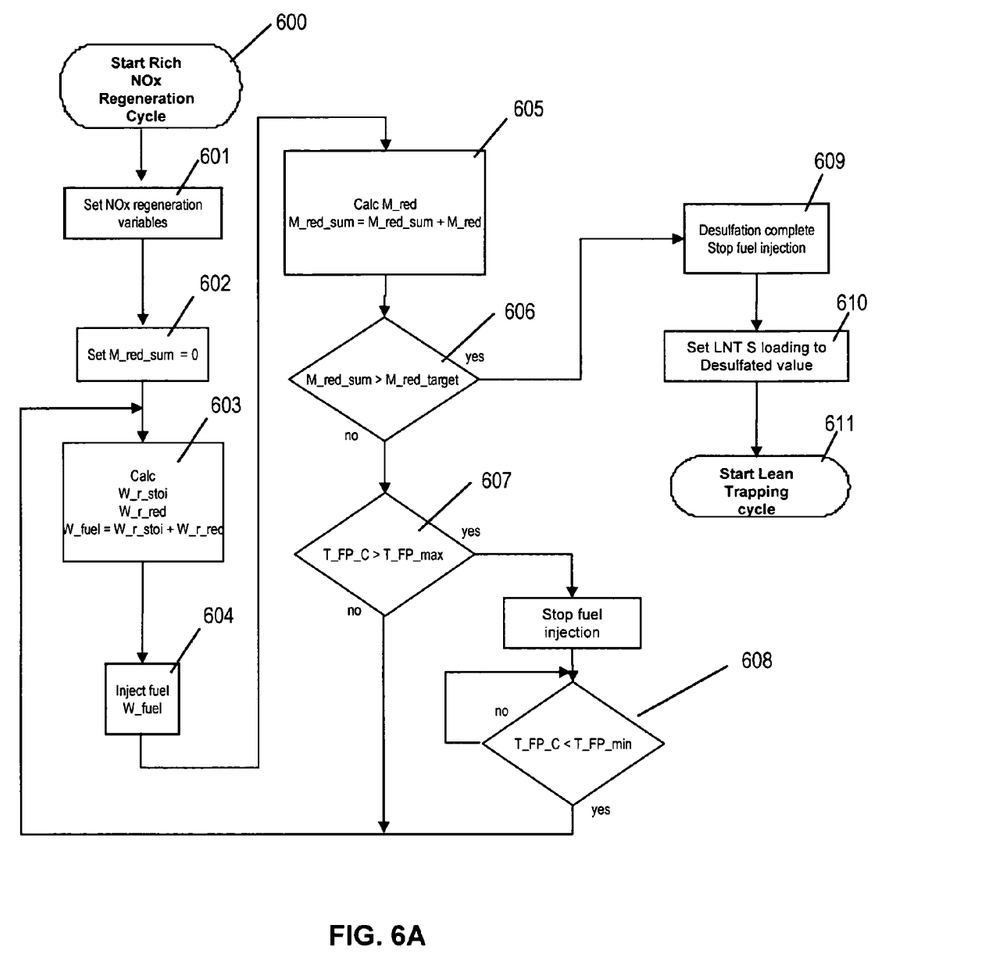
FIGS. 6A and 6B illustrate exemplary control strategies for operating a fuel processor during regeneration and desulfation modes of operation, respectively.

FIG. 5 illustrates an exemplary method of operation and control strategy for a lean warm-up cycle as described, e.g., with respect to blocks 160 and 180 of FIG. 4. FIG. 6A illustrate exemplary methods of operation and control for Rich $NO_x$ Regeneration and FIG. 6B for Rich Desulfation.

Figure 6B:
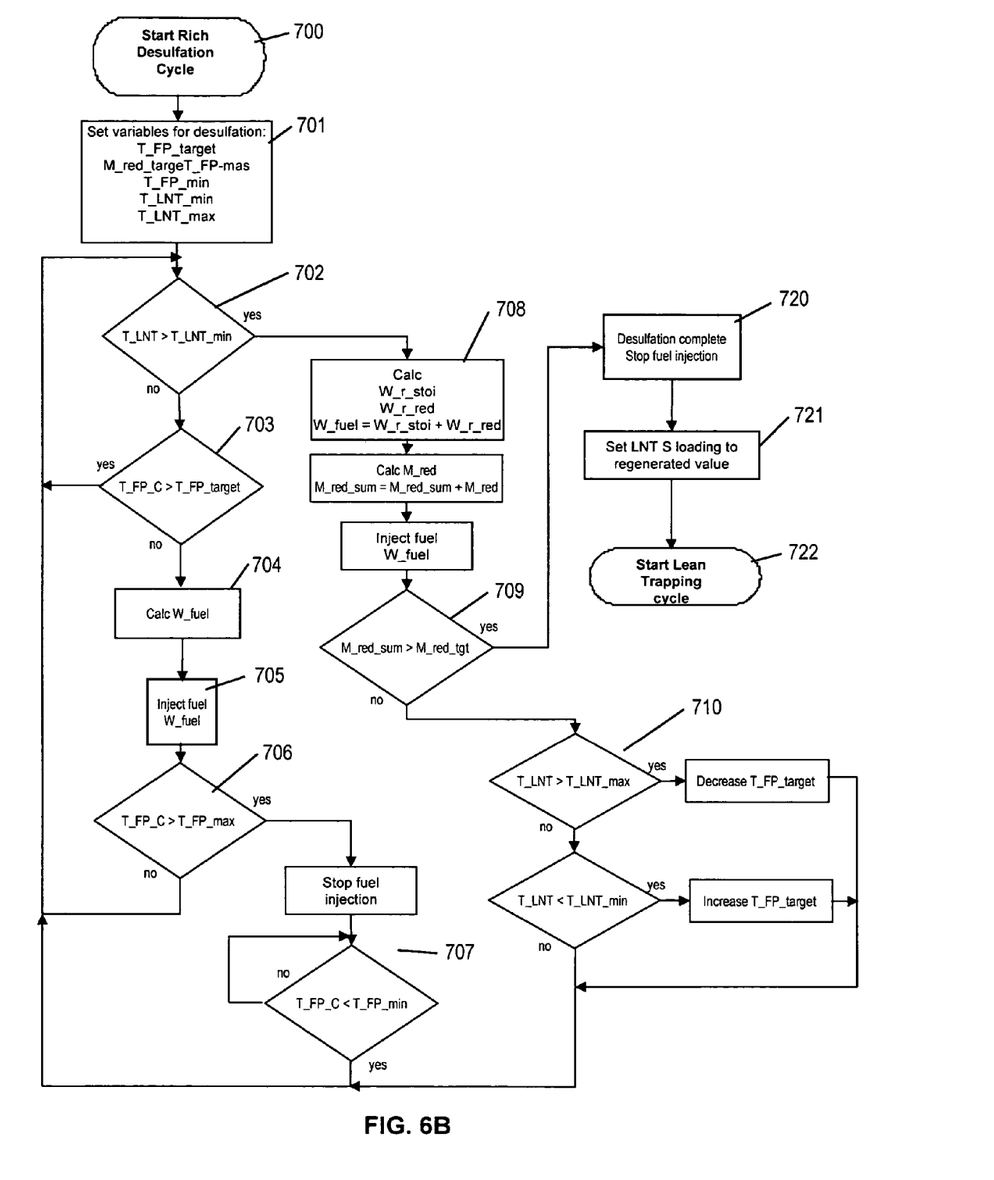

With regard to FIGS. 5, 6A, and 6B, and within this specification, the following abbreviations are used:

| | |
|---|---|
| FP | fuel processor |
| T_FP_C | fuel processor temperature in current ECU cycle |
| T_FP_target | target fuel processor temperature |
| T_FP_max | maximum fuel processor temperature |
| T_FP_min | minimum fuel processor temperature |
| T_FP_LOT | fuel processor light off temperature |
| T_FP_EXT | fuel processor extinction temperature |
| T_EXH | exhaust temperature at fuel processor inlet |
| W_fuel | fuel injection rate |
| W_r_stoi | fuel injection rate to combust all exhaust oxygen |
| W_r_red | fuel injection rate to product target level of reductant |
| M_red | moles of reductant produced during current ECU cycle |

| | |
|---|---|
| M_red_sum | total moles of reductant produced during regeneration cycle |
| M_red | target target moles of reductant for complete regeneration or desulfation |
| C_O2 | exhaust oxygen level |
| C_O2_Rmax | maximum level of oxygen for rich operation |

In FIG. 5 a lean warm up strategy starting at 501 is shown. Block 502 determines T_FP_C, the current fuel processor temperature. Block 503 and 504 determine whether the fuel processor is above the light off temperature and whether the exhaust temperature is above the extinction temperature. If both of these criteria are satisfied, and the fuel processor is not yet at the target temperature, block 505, a calculation of the fuel injection rate is made, 506, and this fuel injected at 507. This cycle is repeated until the fuel processor is at the target temperature, 505, at which point the lean warm up is complete and depending on where the next mode is desulfation or $NO_x$ regeneration, 508, a rich $NO_x$ regeneration is initiated, 509, or a desulfation is initiated, 510. The rate at which the fuel processor is heated can be from 10 to 200° C./s and preferably from 25 to 100° C./s.

FIG. 6A shows an exemplary rich $NO_x$ regeneration cycle starting at 600. Block 601 sets the variables for a $NO_x$ regeneration cycle. These variables include such values as T_FP_max, T_FP_min, M_red_target, etc. Block 602 sets the amount of reductant produced to zero to initialize the regeneration process. 603 calculates W_r_stoi, the fuel injection rate to consume the oxygen in the exhaust flow and W_r_red, the fuel injection rate to produce the level of reductant desired for the regeneration of the $NO_x$ trap. Block 604 injects this fuel flow rate for this ECU cycle. Block 605 calculates the moles of reductant produced and sums the total reductant in each ECU cycle. Block 606 checks the total reductant produced to see if the target reductant level has been produced to regenerate the $NO_x$ trap. If the target reductant level has not been achieved, then the process is repeated until the total reductant sum reaches the target value. Block 607 calculates T_FP_C from the combined heat of combustion of the rich fuel with the oxygen present in the exhaust stream and the heat of reforming from the reforming of the remaining fuel. Blocks 607 and 608 stop the rich regeneration process if the fuel processor temperature exceeds the fuel processor temperature limit. When the target reductant level has been achieved, the $NO_x$ trap regeneration is complete, 609, the $NO_x$ trap loading is set to zero and the lean trapping cycle started, 611.

FIG. 6B shows a basic desulfation cycle starting at 700. Block 701 sets the variables to the values for $NO_x$ trap desulfation. These variables include T_LNT_min, T_LNT_max, T_FP_max, T_FP_min, M_red_target and the other variables required to control the desulfation cycle. Block 702 checks to see if the $NO_x$ trap (LNT) is at the minimum desulfation temperature. If it is not yet at the desulfation temperature, blocks 703, 704, 705, 706, and 707 control the fuel processor temperature to the value required to heat the $NO_x$ trap to the desulfation temperature. Block series 707 stops fuel flow to the fuel processor if it becomes too hot thus allowing it to cool. When the LNT is at the target temperature for desulfation, then 708 through 709 control the rich operation of the fuel processor to produce the required amount of reductant. Bock series 710 shuts off the fuel to the fuel processor if the $NO_x$ trap temperature rises above the maximum temperature, T_LNT_max. When the target amount of reductant has been produced, the desulfation is complete, 720, the LNT sulfur loading is set to zero or to the sulfur loading value consistent with a desulfated LNT, 721, and the lean trapping cycle is started, 722. Since the desulfation cycle can run for long periods of time, e.g., minutes as compared to a $NO_x$ regeneration cycle that is typically seconds, other control strategies may be required. For example, the feed forward or model based control strategy shown in FIG. 6B can be used to control the fuel to the fuel processor based totally on a calculated T_FP_C for the entire period of the desulfation cycle. Alternatively, the temperature at the fuel processor outlet or the LNT inlet can be measured by a temperature sensor and this measured temperature compared to a target temperature for these values. The difference or error between the measured temperature compared to the target temperature can then be used to adjust the value of T_FP_target to maintain the desired value at the fuel processor outlet or at the LNT inlet. This correction can be done by a PID or feedback strategy that adjusts the target fuel processor temperature or by a simple correction to the T_FP_target value. The correction can be done every calculation cycle or it can be done less frequently, say every 0.2 to 10 seconds. A slower correction or adjustment to the T_FP_target may be preferred since the feed forward strategy is designed to handle rapid system changes.

The desulfation strategy shown in FIG. 6B describes a lean warm up strategy that raises the fuel processor temperature and then the LNT temperature all under lean conditions. When the LNT is at the target temperature for desulfation, then rich operation is started to produce reductants for desulfation of the LNT. An alternative strategy would be to heat the LNT while operating the fuel processor in a lean-rich mode. By providing rich periods and reductants to the LNT during this heat up process, the LNT is kept relatively clean of $NO_x$ thus increasing the level of $NO_x$ removal from the exhaust stream. In addition, operating rich or with rich and lean cycling during the heat up of the LNT can substantially reduce the $NO_x$ emissions since the LNT would act as an $NO_x$ reduction catalyst during the rich periods when both $NO_x$ and reductant ($H_2$ and CO) are passing through the LNT. The frequency or lean and rich fraction could vary widely depending on the design of the LNT and depending on the LNT temperature.

These exemplary control strategies can use a number of different input parameters and different methods to use these input parameters.

The fuel processor catalyst temperature can be measured by a sensor such as a thermocouple placed within the catalyst. Alternatively the catalyst inlet and/or outlet gas temperature can be measured and the fuel processor temperature calculated or estimated from either of these or from an average of these values. These measured values can then be used in a feedback control strategy to control fuel flow to the fuel processor to achieve a target temperature. Generally, it is desired that the ECU cycle be fast and that the temperature sensors be fast since very fast thermal response of the fuel processor is required to achieve good fuel efficiency.

Alternatively, a model based calculation can be used to calculate the fuel processor temperature wherein the inlet gas temperature, gas flow rate and the heat capacity of the fuel processor catalyst are used to calculate the fuel processor unit temperature during each control system calculation cycle. When fuel is injected, the heat of reaction of the fuel on the fuel processor is incorporated into this calculation to calculate the fuel processor temperature. This heat release from reaction is distributed to raising or lowering the fuel processor temperature and to raising or lowering the flowing exhaust gas temperature. For this calculation, one approach is to assume that the fuel processor catalyst and the gas flow reach the same temperature and the temperature is uniform throughout the fuel processor catalyst. While these assumptions are a simplification, the deviation from reality is not large for the typical fuel processor system in the application described here and these assumptions can be used to make the calculation simple and fast. This calculation could be done on every control system calculation cycle using only the exhaust flow rate and temperature to estimate the fuel processor temperature during the lean $NO_x$ trapping cycle or during cool down of the fuel processor after a regeneration cycle. When fuel is injected, the same calculation would then calculate the fuel processor temperature rise both during the lean heat up portion of the cycle and during the rich regeneration portion of the cycle using the heats of reaction for each of these processes. The model based process may be the preferred process since the lowest fuel penalty is obtained with fuel processor units with very low heat capacity and with a very fast heat up and cool down. Such fast heat up and cool down would be difficult to accurately follow with typical temperature sensors.

The $NO_x$ concentration and sulfur concentration in the exhaust system must be measured or estimated to allow calculation of the $NO_x$ loading and S loading on the $NO_x$ trap. $NO_x$ concentration in the exhaust can be determined using a $NO_x$ sensor. Combined with the exhaust flow rate, the total $NO_x$ flux through the $NO_x$ trap can be determined. Either this total $NO_x$ flux can be assumed to accumulate on the $NO_x$ trap or a second sensor at the outlet of the $NO_x$ trap can used to estimate the $NO_x$ that has passed through the $NO_x$ trap and by difference the $NO_x$ accumulation on the $NO_x$ trap. Alternatively an $NO_x$ trapping model can be used to determine the $NO_x$ accumulation on the $NO_x$ trap based on just the $NO_x$ concentration and exhaust flow rate into the $NO_x$ trap. The $NO_x$ trapping model could be an equation or a lookup table giving the fraction of the $NO_x$ flux through the $NO_x$ trap that is adsorbed as a function of some or all of the $NO_x$ trap conditions such as exhaust flow rate, exhaust temperature, exhaust $NO_x$ concentration, $NO_x$ trap temperature, $NO_x$ loading on the $NO_x$ trap, exhaust oxygen level, NOx trap age or vehicle miles and other variables. The $NO_x$ concentration in the exhaust stream can also be obtained by means other then from a $NO_x$ sensor. An engine map can be created that relates the engine operating conditions such as rpm and torque to the $NO_x$ concentration in the exhaust stream. By engine map is meant a table or mathematical expression that relates the $NO_x$ level to operating conditions of the engine and can be obtained by operating the engine at a variety of conditions and measuring the $NO_x$ concentration in the exhaust stream. Other engine variables can be used for this engine map such as turbocharger boost pressure, exhaust oxygen level, exhaust temperature, inlet air flow rate, etc.

Similarly, the sulfur accumulation can be estimated from sensor measurement of the sulfur level in the exhaust. Alternatively, the total fuel consumed by the engine and the level of sulfur in the fuel can be used to estimate accumulation by assuming that all of the sulfur is trapped on the $NO_x$ trap. The fuel consumption rate can be measured by a fuel flow meter or estimated from an engine map relating engine fuel flow rate or exhaust sulfur concentration as a function of engine operating parameters as described above. Alternatively, sulfur accumulation on the $NO_x$ trap can be related to vehicle miles or simply to operating time of the engine. These latter two procedures may give only a very rough estimate of the total sulfur accumulation but it may be sufficient to determine when the $NO_x$ trap needs a desulfation cycle.

In certain system configurations, a precombustion catalyst is placed between the fuel injector and the fuel processor catalyst. For example, an exemplary precombustor is described in U.S. patent application Ser. No. 10/910,213, filed Aug. 2, 2004 and entitled, "PRECOMBUSTORS FOR INTERNAL COMBUSTION ENGINES AND SYSTEMS AND METHODS THEREFOR" the entire content of which is incorporated herein by reference in its entirety. In such a configuration, the fuel injected into the precombustor and fuel processor system is partially combusted on the precombustion catalyst and the remaining fuel combusted on the main fuel processor catalyst. The control of such a system is more complicated when done by a model based approach in which the fuel processor catalyst temperature is estimated from exhaust flow, exhaust temperature, fuel injection rate and fuel processor heat capacity. The preferred method would be to estimate the fraction of fuel combusted on the precombustion catalyst from a correlation using several parameters selected from exhaust temperature, exhaust flow rate, fuel injection rate and exhaust oxygen concentration. The remaining fraction of fuel not combusted on the precombustion catalyst will be the fuel flow rate at the inlet to the main fuel processor catalyst. This fuel flow rate combined with the exhaust temperature at the fuel processor inlet can then be used with the model based approach described above to calculate the fuel processor temperature at each control system cycle. Alternatively, the temperature at the fuel processor inlet can be estimated from the temperature at the inlet to the precombustion catalyst and the heat rise from the fraction of fuel combusted on the precombustion catalyst.

It should be noted that a simple model that assumes the temperature of the fuel processor is uniform and is essentially equal to the gas temperature exiting the fuel processor catalyst described herein is a good approximation and can provide a good model based feed forward control strategy that is simple and fast. However, a better estimate of the fuel processor temperature can be obtained by including in the model kinetics of reaction on the fuel processor catalyst and heat transfer from the catalyst coated monolithic surface to the gas phase. In addition, this model can be applied to segments of the catalyst from inlet to outlet to obtain a temperature profile through the catalyst unit. The control strategy can then include strategies to adjust the overall temperature profile of the catalyst to the desired temperature profile or to prevent portions of the catalyst from operating above or below the desired temperature range. For example, the outlet section that contains the reforming catalyst can be adjusted to the correct temperature before the fuel injection rate is adjusted to the rich regeneration condition. This would insure complete reforming of the rich fuel and optimize operation. Such a model could include the actual kinetics of both the oxidation of fuel and the reforming of the fuel, mass transfer of the reactant diesel fuel to the catalyst surface, heat transfer of the reaction heat from the catalyst surface to the gas phase giving a calculated catalyst temperature and gas temperature for each axial slice of the fuel processor catalyst unit. Alternatively, such calculations of reaction rates or heat transfer rates could consist of simplified correlations that relate fraction of heat transferred to the catalyst and to the gas phase based on parameters selected from the gas flow rate, the temperature of the gas stream in that segment of catalyst, the temperature of the catalyst in that segment of the monolithic catalyst, the gas composition in that segment of the monolithic catalyst etc. Other correlations are similarly possible and would be obvious to those familiar with the art.

In many of the control strategies for a fuel processor described herein, a number of parameters are used in calculating the fuel processor temperature, $NO_x$ accumulation, sulfur accumulation, reductant quantity etc. These parameters can be obtained by a several methods. Exhaust flow rate can be approximated by using the inlet air flow rate or by adding the fuel flow contribution to the inlet air flow rate. Alternatively an engine map can be used to estimate exhaust flow rate from selected engine operating conditions. Similarly exhaust oxygen level, exhaust $NO_x$ level and exhaust temperature can be obtained from sensors or from an engine map. An engine map is a correlation that relates the desired function to one or more operating conditions of the engine and is either expressed as a multi-dimensional table or an equation.

The control strategies described above can be in the form of mathematical expressions in the engine or emissions system control unit or these expressions can be reduced to one or more multidimensional tables, so called look-up tables, stored in or retrievable by the control unit. Other system variables such as fuel processor equivalence ratio, concentration of reductant produced by the fuel processor, length of time the fuel processor is operated in the rich mode, operating temperature of the fuel processor, and other aspects of the fuel processor, can be determined in a similar manner. In utilizing the control strategies hereinabove described, any number of sensors, microprocessors, fuel flow rate regulators, and throttle regulators may be used, all of which are well-known in the art. The present invention may be further understood with reference to the following non-limiting examples.

Although the present inventions have been described in connection with various examples and aspects, it is not intended to be limited to the specific form set forth herein. Rather, the scope of the present invention is limited only by the claims. Additionally, although a feature may appear to be described in connection with a particular example or aspect, one skilled in the art would recognize that various features of the described examples and aspects may be combined in accordance with the invention. Moreover, aspects of the invention describe in connection with an example or aspect may stand alone as an invention.

Moreover, particular examples have been discussed and how these examples are thought to address certain disadvantages in related art. This discussion is not meant, however, to restrict the various examples to methods and/or systems that actually address or solve the disadvantages.

What we claim is:

1. A method for controlling a fuel processor, the method comprising:
   i) determining a temperature of an exhaust flow to the fuel processor, the fuel processor including a fuel processor catalyst;
   ii) determining a concentration of $O_2$ in the exhaust flow upstream of the fuel processor catalyst;
   iii) determining a rate of the exhaust flow;
   iv) estimating separate temperatures for at least two separate areas within the fuel processor catalyst, the areas being at different location at least with respect to the direction of the exhaust flow, the estimates being based at least in part on a heat transfer coefficient value between the exhaust gas and the fuel processor catalyst; and
   v) adjusting a fuel flow rate to the fuel processor based on i), ii), iii), iv) and a heat capacity value associated with the fuel processor in order to heat the separate areas of the fuel processor catalyst to a reforming temperature and to subsequently operate the fuel processor rich to produce reformate that releases and reduces $NO_x$ trapped with an $NO_x$ storage-reduction catalyst;
   wherein the fuel processor is positioned with an exhaust line of a diesel engine upstream from the $NO_x$ storage-reduction catalyst.

2. The method of claim 1, wherein the fuel flow rate is adjusted to limit the rates of temperature increase for each of the separate areas within the fuel processor catalyst so that each remains below a limit value between 10 and 200° C. per second.

3. The method of claim 1, wherein the fuel flow rate is adjusted to limit the rates of temperature increase for each of the separate areas within the fuel processor catalyst so that each remains below a limit value between 25 and 100° C. per second.

4. The method of claim 1, further comprising deferring rich operation of the fuel reformer until the estimated temperatures for each of the separate areas within the fuel processor catalyst have reach a minimum temperature that is at least 550° C.

5. The method of claim 1, further comprising modifying an engine characteristic to adjust the oxygen level of the exhaust during a portion of the fuel processor operation.

6. The method of claim 5, wherein the exhaust oxygen level is adjusted during the period when the fuel processor is operating under a rich condition.

7. The method of claim 5, wherein the exhaust oxygen level is adjusted by changing either one or both of 1) amount of engine air throttling or 2) amount of EGR flow.

8. The method of claim 1, further comprising adjusting the fuel flow rate to the fuel processor to maintain the estimated temperatures for each of the regions within a predefined temperature range during rich operation.

9. The method of claim 8, wherein the predefined temperature range is from approximately 550-850° C.

10. The method of claim 8, wherein the predefined temperature range is from approximately 600-800° C.

11. The method of claim 8, further including adjusting the fuel flow rate to the fuel processor during the reforming process to produce a predefined concentration of refomate, while maintaining the temperatures within the predefined temperature range.

12. The method of claim 11, wherein the predefined concentration of reformate is between 0.5% and 16%.

13. The method of claim 11, wherein the predefined concentration of reformate is between 2% and 12%.

14. The method of claim 11, further comprising maintaining the reforming process until the total production of $H_2$, CO, or $H_2$+CO reaches a desired value.

15. The method of claim 11, further including maintaining the reforming process until the total production of reformate reaches a desired ratio in relation to $NO_x$ trapped by the $NO_x$ trap.

16. The method of claim 15 wherein the ratio is a function of a temperature associated with the $NO_x$ trap and the exhaust flow rate.

17. The method of claim 1, wherein the fuel addition is suspended unless the inlet gas to the fuel processor is greater than the light off temperature than the light off temperature.

18. The method of claim 1, wherein the light-off temperature is determined from a function or look-up table relating exhaust flow to light-off temperature.

19. The method of claim 1, further comprising ceasing fuel to the fuel processor if the temperature of the inlet gas to the fuel processor is below a temperature associated with an extinction temperature of the fuel processor catalyst.

20. The method of claim 19, wherein the extinction temperature is determined from a function or look-up table relating exhaust flow to light-off temperature.

21. The method of claim 1, further including preheating the fuel flow to the fuel processor.

22. The method of claim 21, wherein the fuel flow is heated by a precombustor catalyst disposed upstream of the fuel processor catalyst.

23. The method of claim 1, further comprising monitoring each of the estimated temperatures and ceasing fuel to the fuel processor if either temperature is above a predetermined maximum temperature.

24. The method of claim 23, wherein the predetermined maximum temperature is between 700 and 850 degrees.

25. The method of claim 23, wherein if the fueling is ceased due to the predetermined maximum temperature having been reached, the fueling is resumed again before the fuel processor cools below a minimum temperature for rich reformate production.

* * * * *